United States Patent
Freudenrich et al.

(10) Patent No.: US 6,872,417 B1
(45) Date of Patent: Mar. 29, 2005

(54) NIXTAMALIZATION PROCESS

(75) Inventors: Allen Lee Freudenrich, Princeton, TX (US); William Arthur Moore, Jr., Plano, TX (US); Indu Namboodiri Sardeshpande, McKinney, TX (US)

(73) Assignee: Frito-Lay North America, Inc., Plano, TX (US)

( * ) Notice: Subject to any disclaimer, the term of this patent is extended or adjusted under 35 U.S.C. 154(b) by 0 days.

(21) Appl. No.: 10/696,056

(22) Filed: Oct. 29, 2003

(51) Int. Cl.$^7$ ................................................ A23K 1/00
(52) U.S. Cl. .................. 426/615; 426/463; 426/508; 426/549; 426/618; 426/622; 426/626; 241/6; 241/8; 241/12
(58) Field of Search ........................... 426/618, 622, 426/442, 510, 626, 549, 615, 508, 463, 464, 507, 506, 481, 478, 458, 455, 450, 443; 64/57 R, 57; 241/8, 6, 12

(56) References Cited

U.S. PATENT DOCUMENTS

| | | |
|---|---|---|
| 3,117,868 A | 1/1964 | Madrazo et al. |
| 5,532,013 A | 7/1996 | Martinez-Bustos et al. |
| 5,558,898 A | 9/1996 | Sunderland |
| 5,652,010 A | 7/1997 | Gimmler et al. |
| 5,744,184 A * | 4/1998 | Kendall et al. ............. 426/506 |
| 6,025,011 A * | 2/2000 | Wilkinson et al. .......... 426/622 |
| 6,254,914 B1 * | 7/2001 | Singh et al. ................ 426/482 |
| 6,344,228 B1 * | 2/2002 | Rubio et al. ................ 426/510 |
| 6,428,828 B1 | 8/2002 | Jackson et al. |
| 2002/0168458 A1 * | 11/2002 | Rodriguez et al. .......... 426/549 |

* cited by examiner

Primary Examiner—Keith Hendricks
Assistant Examiner—Maureen C. Donovan
(74) Attorney, Agent, or Firm—Colin P. Cahoon; Chad E. Walter; Carstens & Cahoon, LLP

(57) ABSTRACT

A method of saving water, wastewater, lime, and energy while increasing productivity and enhancing product quality in a nixtamalization process. More specifically, during the grain cook and steep process, the phase-separated supernate is retained for a subsequent batch of grain. In addition, a fresh water rinse stream is recycled as push water.

10 Claims, 2 Drawing Sheets

NIXTAMALIZATION PROCESS

BACKGROUND OF THE INVENTION

1. Technical Field

The present invention relates to saving water, wastewater, lime, and energy while increasing productivity and enhancing product quality in a nixtamalization process and, more particularly, to a method for saving water whereby supernate from a corn-slurry is not drained, but is instead reused in a subsequent batch thereby saving precious resources. The method of this invention also relates to a method for saving water by reusing some water in such a manner as to avoid impurities.

2. Description of Related Art

The corn from corn tortilla chips such as those in the snack food industry is sometimes cooked and soaked prior to being made into a flour, dough, or masa. One example of this process is the treatment of corn in a nixtamalization process—the traditional method for processing fresh corn to form masa dough. This process dates back to the pre-Columbian era of the Aztec and Maya people in Mesoamerica. In the traditional nixtamilization process, fresh whole-kernel corn is first soaked in a solution of water and lime (calcium hydroxide) and then partially cooked at or near the boiling point for a short time depending on the hardness of the corn. The corn is then steeped in the limewater solution and is allowed to cool for about 8–18 hours in order to loosen and degrade the pericarp (or bran), which is the outer, fibrous layer of a corn kernel. Cooking and steeping in alkaline solution causes partial dissolution of the cuticle and other pericarp layers as well as swelling and weakening of cell walls and fiber components. The corn kernels are then drained of the cooking liquor (called "nejayote"), which contains loosened pericarp and other dissolved or suspended particles, and the corn kernels are washed to remove excess lime and loose particles. Typically, up to 15% by weight of the total corn fraction is lost during the cooking and washing steps. The corn kernels are then ground to disrupt the starch-containing cell structures and cause the mixture to gelatinize. The ground, wet mixture can be mixed with water to form fresh masa dough, or it can be dehydrated to form dry masa flour. Dry masa flour can be rehydrated at a later time to form masa dough.

A schematic diagram showing a prior art cook and soak process is illustrated in FIG. 1. In this prior art process, two kettles are used. The process starts with the addition of various components of an aqueous alkaline and grain mixture. For example, 1200–1700 pounds of corn, 1–5% lime, and about 325 gallons of water are placed into a steam-jacketed kettle 10. This mixture is then heated to its cook temperature by use of a steam jacket to near boiling.

Once the target temperature is reached, the corn, lime, and water mixture is cooked at the cook temperature for a set number of minutes. Following the cook, 325 gallons of fresh water 24 is added to the kettle 10 via a fresh water line 11 to cool the batch approximately about 60–80° F. In this prior art example, approximately 650 gallons of water is required for every batch of corn processed through the kettles 10. The kettle of corn-slurry is then pumped via a discharge line 12 to a soak tank 14 to be "steeped" or soaked. Some of the soak tank excess water is drained via an overflow line 16 to the sewer 60 or other discharge processing means. In many instances, water discharged to the sewer is fairly alkaline and must be treated as wastewater prior to its final discharge into the environment. After the corn-slurry has been in the soak tank 14 for about 8–18 hours, the slurry is sent to a corn hopper 30 by way of a transfer line 18. Although FIG. 1 shows only two soak tanks, because the time the corn is in the soak tank 14 exceeds the time the corn is in the kettle 10, many more soak tanks 14 may be required if a continuous process is desired. A fresh push water stream 22 of about 10–20 gallons per minute is sprayed into the soak tank 14 discharge pipe to transport the corn from the soak tank 14. About 90 gallons of water is typically used to transport the corn. The corn hopper 30 separates corn and water. The excess water is sent to the corn hopper drain line 34 and then to the sewer 60. The corn-slurry is then gravity fed via a hydrosieve 32 into a washer 38. Excess water is sent to the hydrosieve drain line 36 and then to the sewer 60. The washer 38 is a rotating drum that utilizes a fresh wash water stream 26 to gently rinse the corn of hulls and lime. The fresh wash water stream 26 typically flows at 20–30 gallons per minute. The excess washer wastewater stream 40 from the washer 38 is also drained and routed to the sewer 60. From the washer 38, the corn is sent to the drain belt 42 where the excess water, via the drain belt wastewater stream 46, is sent to the sewer 60. The corn is then sent to further processing 44 where it is made into a product such as flour, masa, or dough.

There are several drawbacks to this process. One drawback is that fresh kettle water, usually at ambient temperature must be heated via a steam jacket in the kettles 10 to a temperature at or near boiling, which requires substantial resources. Another drawback is that there is an undesirable temperature gradient in the kettle 10. Because ambient water in the center of the kettle 10 comes in much cooler as fresh kettle water and because mixing in the kettle is done in a very gentle manner, the temperature gradient results in some uneven cooking, lessening product quality. An additional drawback is that any soak tank excess water 16, after being heated, is then drained and sent to the sewer via the overflow line 16. Thus, the process has spent resources heating water that is essentially wastewater. Additionally, as previously mentioned, these waste streams are often discharged with relatively high alkalinity and solids contents that often require further treatment prior to their discharge back into the environment. Consequently, there is a need to minimize the amount of soak tank excess water that is discharged from the soak tanks 14 to save water, steam, and wastewater treatment resources that does not diminish productivity or product quality.

One prior art method used to solve this is illustrated by U.S. Pat. No. 3,117,868 issued to Madrazo on Jan. 14, 1964. Rather than cooking the corn in a saturated limewater solution, the Madrazo patent discloses mixing hot alkaline water vapors with the corn in a pressurized vessel. This invention has a major drawback, however. It would require the purchase and installation of major pieces of new equipment, namely a pressure vessel and perhaps a blower, depending on the embodiment of the invention chosen.

Another drawback to the prior art grain cook and steep process depicted in FIG. 1 is that fresh push water 22 must be used to cool and transport the corn and its associated transfer line 18 only to be later drained in either the corn hopper drain line 34 or the hydrosieve drain line 36. The fresh push water stream 22 typically flows at 10–20 gallons per minute.

Recycling wastewater streams is not easily achieved because solids build-up from the corn can occur. Solids build-up is undesirable because it causes lime blinding of the hydrosieve 32 and washer 38 screens as well as fouling and scaling of the equipment that requires downtime to clean, lowering production rates. The presence of solids also increases the presence of microbes—an undesirable result in the food processing industry.

Fresh wash water is also used only once to rinse the corn before becoming washer wastewater stream 40. The fresh wash water stream 26 typically flows at about 20–30 gallons per minute. Again, this wastewater stream is often discharged with relatively high alkalinity and solids contents that require further treatment prior to their discharge back into the environment.

Consequently a need exists for methods to minimize amounts of water, wastewater and steam required that can be adapted to existing processing equipment while maintaining or enhancing production rates and product quality.

SUMMARY OF THE INVENTION

The proposed invention drains a kettle to a pre-determined level rather than completely draining the kettle and sends approximately the correct amount of water required for the soak. This substantially minimizes the soak tank wastewater stream. Also, because some warm water remains in the kettles after the corn is drained, less fresh kettle water is required to refill the kettles. Because some lime remains in the kettle, less lime is required to be added and there: is less total lime to process in a wastewater stream. Moreover, the average starting temperature of the corn, lime, and water mix in the kettle is higher, requiring less steam and/or less time to heat the corn, lime, and water mixture to its cooking temperature. In addition, because less fresh, water is required for each batch, it takes less time to add the water. Further, when less time for water addition and heating is required, production rates are increased and steam consumption is reduced.

The proposed invention also decreases the amount of fresh water required by recycling the washer wastewater. Recycling the water is made possible by routing the washer wastewater to a collection tank, then to a hydroclone and back to the collection tank to reduce the amount of solids in the water. The recycle water can then act as a substitute for the push water that was required to cool and transport the corn when transferring corn from the soak tank. By this method, the fresh push water stream can be substantially reduced or even eliminated.

Hence, this invention produces a method that minimizes the amount of limewater, wastewater and steam, and requires minimal capital investment. Furthermore, product quality is enhanced and productivity is actually increased. The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 2:
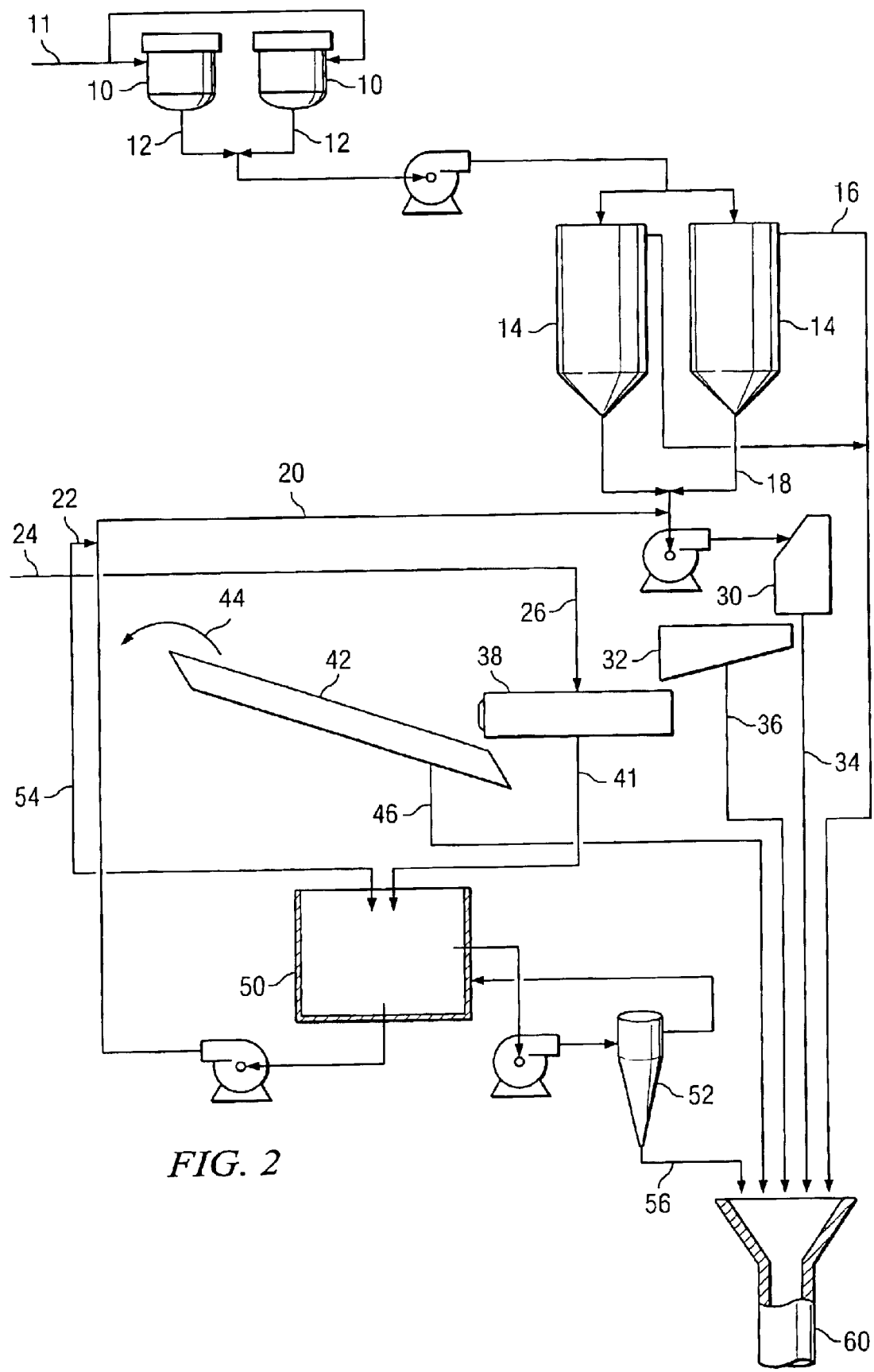
FIG. 2 shows a schematic representation of one embodiment of the improved process.

An embodiment of the innovative invention will now be described with reference to FIG. 2. The same reference numbers are used to identify the same corresponding elements throughout all drawings unless otherwise noted. There are two separate parts to this invention; saving water, wastewater, lime, time and heat in the grain cook and steep process and saving water and wastewater by converting the washer wastewater stream into a recycle stream.

The first part of this invention, relating to saving water, wastewater, lime, time and heat in the grain cook and steep process is novel because it removes substantially only the corn-slurry from the kettle 10, thereby leaving the supernate in the kettle 10 for the next batch of corn. For purposes of this invention, supernate refers to a substantially corn-free alkaline mixture. As indicated previously, after the corn/limewater mixture is cooked, fresh kettle water is added to the kettle 10 to cool the batch. A settling effect occurs causing the corn-slurry to sink below the supernate. This settling effect, or phase separation, causes a fairly defined supernate/corn-slurry interface in the kettle. Rather than draining the entire mixture from the kettle 10, only the corn-slurry portion is drained from the bottom of the kettle thereby leaving the supernate in the kettle 10. In one embodiment, a level transmitter shuts a valve on the kettle outlet line 12 after the kettle 10 is drained to a pre-determined level. This pre-determined level is preferably set at the level required to drain substantially all the corn-slurry below the supernate/corn-slurry interface, leaving only supernate in the kettle 10. One way the pre-determined level can be ascertained is by monitoring the vibration in the kettle outlet line 12 when the corn-slurry is being routed to the soak tank 14. The corn-slurry causes more vibration in the kettle outlet line 12 than the supernate during transport to the soak tank 14. Thus, when the amount of vibration in the line 12 changes, it is an indication that the supernate/corn-slurry interface has passed through that portion of the line 12 and only supernate remains in the kettle 10. Because the varying sizes of kettles and varying batch sizes, some experimentation may be required to determine an optimum pre-determined level. In an alternative embodiment, vibration sensors could be placed on the kettle outlet line 12 to transmit a signal to close a valve on this line when the vibration in the line reached a certain threshold. Draining to a pre-determined level or draining until the vibration in the line reached a certain threshold are just two examples of a level indicating means that can be employed. Any method that drained the slurry to the soak tank until only supernate remained in the kettle could be used.

The numerous benefits of this invention are illustrated by returning to the prior art examples. First, substantial water savings was achieved. In the example used, 325 gallons of fresh water was required to cook the corn. Another 325 gallons of fresh kettle water was required to cool the corn following cooking. Thus, a total of 650 gallons of fresh water was required to cook and cool each batch of corn.

In accordance with the instant invention, after the 325 gallons of fresh kettle water and the phase separation has taken place, the supernate/corn-slurry interface was at the level where 235 gallons of supernate "floated" on the corn-slurry. By draining the corn-slurry and leaving 235 gallons of supernate for the next batch, 235 less gallons of fresh water was required for the next batch. Thus, only 415 gallons of fresh kettle water was required per batch. This represented a water savings of about 36%. Second, less energy is used. The water left in the kettle was found to be approximately 63° C. (145° F.). Fresh cook corn water is typically supplied at anywhere from approximately 3–30° C. (38–85° F.), depending on location and time of year. Thus, depending on the temperature of supply water, the amount of steam required to heat the corn mixture to near boiling has been calculated to save 7,695 pounds of steam per day from the original 13,000 pounds per day; a savings of 59%. Third, productivity increased. The time required to heat the kettle water to near boiling was reduced by about 30%. This shortened time results in higher productivity. In addition, less time is required to add water to the kettle, since 235 gallons less fresh water is being added per batch, further enhancing production. Fourth, less lime is required because the water left in the kettle still contains about 2–4 pounds of lime from the previous cooked batch. Thus, not only is less lime used, but there is less total lime to be processed in the wastewater stream. Fifth, substantial wastewater savings was achieved. The amount of soak tank wastewater that flowed to the sewer through the overflow line 16 that must be treated was substantially reduced and possibly eliminated. Hence, because there are 235 fewer gallons used in each batch, it follows that 235 gallons less wastewater is produced per batch. Sixth, product quality has increased. Because steam jackets on the outside of the kettle 10 are used to heat and cook the corn mixture, and because mixing in the kettle is done in a very gentle manner, there is an undesirable temperature gradient whereby the areas closest to the outer circumference of the kettle 10 are warmer than the areas closer to the center of the kettle 10. By starting with warmer cook water, there is a lessening of the temperature gradient that allows more uniformity in cooked corn product.

Figure 1:
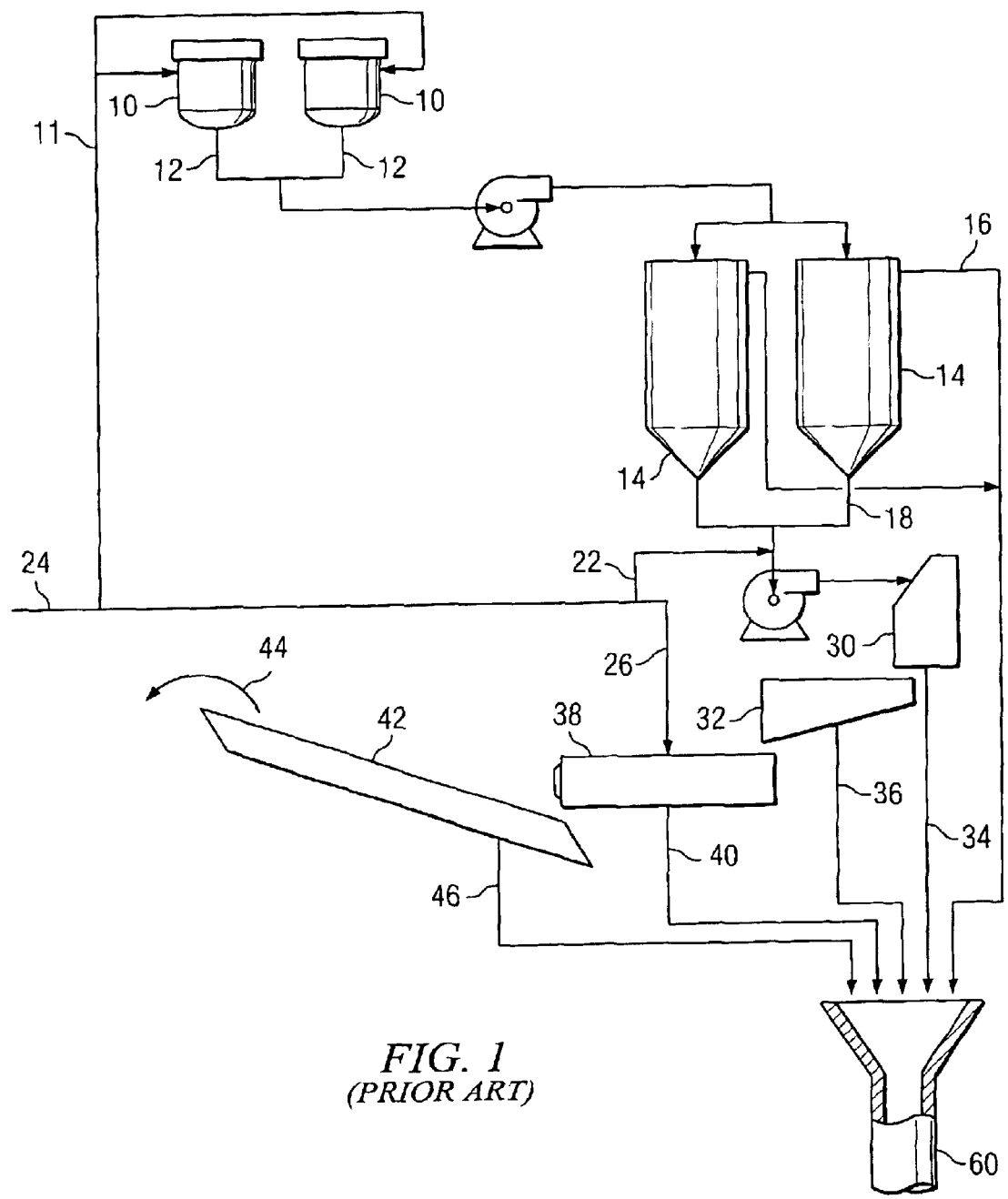
FIG. 1 is a schematic diagram showing the prior art process.

The second part of the invention converts the washer wastewater stream 40 into a recycle stream 41 that partially or completely acts as a substitute for the fresh water used as a push water stream 22. As previously discussed, after the corn is steeped, or soaked, it leaves the soak tank 14. As shown in FIG. 1, the excess washer wastewater stream 40 was previously sent to the sewer 60. This invention, however, converts what is depicted in FIG. 1 as the washer wastewater stream 40 into a recycle stream 41 as shown in FIG. 2. In one embodiment, the recycle stream 41 is routed to a collection tank 50. The recycle stream push water 20 is then used instead of fresh push water 22 to transport and cool the corn as it is transferred to the corn hopper 30. A preferred embodiment of the invention avoids using the corn hopper drain line 34 and hydrosieve drain line 36 waste streams as recycle because these streams have higher solids content than is desirable. In addition the drain belt wastewater stream 46 is preferably not recycled because its water production is relatively low flow.

To reduce the solids content and minimize microbe formation in the recycle push water 20 stream, the water in the collection tank 50 is looped through a solids separation device 52 and then back to the collection tank 50. In a preferred embodiment, the inlet into the collection tank 50 will be submerged so as to minimize turbulence. The solid separation device 52 is any apparatus that serves to separate and dispose of undesirable solids that originated from the washer 38. In a preferred embodiment, a hydroclone serves as the solids separation device 52. For purposes of this invention, whenever a hydroclone is referred to, any equivalent solid separation device is inferred. The piping associated with the hydroclone circulation loop, as well as the hydroclone 52 itself and the separation/collection tank 50 is preferably made of stainless steel to resist fouling and retard solid formation in the lines. Approximately 30% of the water sent to the hydroclone 52 becomes hydroclone wastewater 56 as a result of hydroclone blowdown and is routed to the sewer 60. However, the recycle stream 41, in a preferred embodiment, provides enough water to completely substitute for the fresh push water 22. If the recycle stream 41 does not provide enough water, then a required amount of fresh make-up water 54 can be added to the collection tank 50. In a preferred embodiment, the collection tank 50 has fresh make-up water 54 on level control. In an alternative embodiment, the recycle stream 41 could be routed directly to a solids separation device 52.

Some of the benefits of this invention are illustrated by again returning to the prior art example. First, fresh wash water 26 that is recycled potentially exceeds the amount of recycle push water 20 required to cool and transport the corn from the soak tanks 14 to the corn hopper 30. In one embodiment, the amount of recycle push water 20 required for a transfer was 90 gallons per batch. Thus, an additional 90 gallons of fresh water is potentially saved per batch of corn processed through the grain cook and steep process. Referring to FIG. 1, this savings represents the substantial elimination of the corn wash wastewater stream 40. Thus, 90 gallons of water and wastewater are potentially saved per batch of corn processed.

When added to the 235 gallons of fresh water saved in the kettle cooling operation, a total of 325 gallons of water and associated wastewater are saved. Prior to this invention, 650 gallons were required per batch in the grain cook and steep process and 90 gallons were required for the push water stream for a total of 740 gallons per batch. Thus, taken together, the two parts of this invention, saving 235 gallons of water in the grain cook and steep process and 90 gallons by using recycled water for push water, has achieved a total water and wastewater savings of approximately 44%.

It should be mentioned that although the description of the invention is directed toward the processing of corn, any whole grain could be used including, but not limited to rice, oats, and fibers. In no way is this invention to be construed as directed to or applicable only toward corn processing. Similarly, although any alkaline water solution may be used in our invention, the description of the invention utilizes limewater for convenience because it is the preferred embodiment. In no way is that to be construed to mean that only limewater can be used to cook the corn. Nor is it to be construed that the water solution need be substantially saturated.

While this invention has been particularly shown and described with reference to a preferred embodiment, it will be understood by those skilled in the art that various changes in form and detail may be made therein without departing from the spirit and scope of the invention.

What is claimed is:

1. A cook and soak process using at least one each kettle, soak tank, grain hopper, hydrosieve, hopper, and washer, said process comprising the steps of:

a) placing at least one grain product into a kettle with an aqueous alkaline solution to form an alkaline mixture;
   b) heating said alkaline mixture to a predetermined temperature followed by cooling the cooked mixture with water and then separating said alkaline mixture into a supernate layer and a slurry layer;
   c) draining said slurry and maintaining substantially all said supernate in said kettle to be used with a next alkaline mixture;
   d) soaking said slurry in a soak tank;
   e) transporting said slurry to a hopper via a push water stream wherein said push water stream comprises recycled water from a collection tank and wherein said slurry is substantially drained of liquid and becomes substantially a grain;

f) transporting said grain from said hopper to a hydrosieve;

g) draining excess water from said grain;

h) transporting said grain from said hydrosieve to a washer;

i) washing said grain in said washer with a fresh wash water;

j) draining said fresh wash water of step i) to said collection tank for recycle at step e);

k) transporting said grain to a further process.

2. The method of claim 1, wherein said grain comprises corn.

3. The method of claim 2, wherein said alkaline mixture comprises lime.

4. The method of claim 3, wherein said slurry is drained at step c) until the supernate has reached a pre-determined level in said kettle.

5. The method of claim 4, wherein said pre-determined level is determined by monitoring a vibration frequency in a slurry discharge line.

6. The method of claim 4, wherein said recycled water further comprises fresh water wherein an amount of fresh water in said collection tank is regulated by a level control.

7. The method in claim 3 wherein said drained fresh wash water from said collection tank at step j) is routed to at least one solids separation device and is then routed back to said collection tank.

8. The method in claim 7 wherein said solid separation device comprises stainless steel.

9. The method in claim 7 wherein said solid separation device comprises a hydroclone.

10. The method in claim 3 wherein said drained fresh wash water at step j) is routed to a solid separation device prior to being sent to said collection tank.

* * * * *